(12) United States Patent
Kim et al.

(10) Patent No.: US 10,318,842 B1
(45) Date of Patent: Jun. 11, 2019

(54) LEARNING METHOD, LEARNING DEVICE FOR OPTIMIZING PARAMETERS OF CNN BY USING MULTIPLE VIDEO FRAMES AND TESTING METHOD, TESTING DEVICE USING THE SAME

(71) Applicant: STRADVISION, INC., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/121,667

(22) Filed: Sep. 5, 2018

(51) Int. Cl.
 *G06K 9/62* (2006.01)
 *G06N 3/08* (2006.01)
 *G06F 17/16* (2006.01)

(52) U.S. Cl.
 CPC ........... *G06K 9/6202* (2013.01); *G06F 17/16* (2013.01); *G06K 9/6262* (2013.01); *G06N 3/084* (2013.01)

(58) Field of Classification Search
 CPC .............. G06N 3/08; G06N 3/02; G06K 9/66; G06K 9/6256; G06K 9/4604; G06K 9/00288; G06K 9/00744; G06K 9/46; G06K 9/6267; G06T 2207/20081; G06T 2207/20084; G06T 3/4046
 See application file for complete search history.

(56) References Cited

PUBLICATIONS

Son, Jeany, et al. "Multi-objec tracking with quadruplet convolutional neural networks." Proceedings of the IEEE conference on computer vision (Year: 2017).*
Tsaig, Yaakov, and Amir Averbuch. "Automatic segmentation of moving objects in video sequences: a region labeling approach." IEEE transactions on Circuits and Systems for Video Technology 12.7 (2002): 597-612. (Year: 2002).*

* cited by examiner

*Primary Examiner* — Vincent Rudolph
*Assistant Examiner* — Raphael Schwartz
(74) *Attorney, Agent, or Firm* — Xsensus, LLP

(57) ABSTRACT

A learning method for learning parameters of convolutional neural network (CNN) by using multiple video frames is provided. The learning method includes steps of: (a) a learning device applying at least one convolutional operation to a (t-k)-th input image corresponding to a (t-k)-th frame and applying at least one convolutional operation to a t-th input image corresponding to a t-th frame following the (t-k)-th frame, to thereby obtain a (t-k)-th feature map corresponding to the (t-k)-th frame and a t-th feature map corresponding to the t-th frame; (b) the learning device calculating a first loss by referring to each of at least one distance value between each of pixels in the (t-k)-th feature map and each of pixels in the t-th feature map; and (c) the learning device backpropagating the first loss to thereby optimize at least one parameter of the CNN.

26 Claims, 9 Drawing Sheets

US 10,318,842 B1

LEARNING METHOD, LEARNING DEVICE FOR OPTIMIZING PARAMETERS OF CNN BY USING MULTIPLE VIDEO FRAMES AND TESTING METHOD, TESTING DEVICE USING THE SAME

FIELD OF THE INVENTION

The present invention relates to a learning method and a learning device for optimizing parameters of a CNN by using multiple video frames, and a testing method and a testing device using the same; and more particularly, to the learning method and the learning device for learning the convolutional neural network (CNN) by using multiple video frames, including steps of: (a) a learning device applying at least one convolutional operation to a (t-k)-th input image corresponding to a (t-k)-th frame and applying at least one convolutional operation to a t-th input image corresponding to a t-th frame following the (t-k)-th frame, to thereby obtain a (t-k)-th feature map corresponding to the (t-k)-th frame and a t-th feature map corresponding to the t-th frame; (b) the learning device calculating a first loss by referring to each of at least one distance value between each of pixels in the (t-k)-th feature map and each of pixels in the t-th feature map; and (c) the learning device backpropagating the first loss in order to minimize the first loss to thereby optimize at least one parameter the CNN; and the testing method and the testing device using the same.

BACKGROUND OF THE INVENTION

Deep learning is a technology used to cluster or classify objects or data. For example, computers cannot distinguish dogs and cats from photographs alone. But a human can easily distinguish those two. To this end, a method called "machine learning" was devised. It is a technique to allow a computer to classify similar things among lots of data inputted into the computer. When a photo of an animal similar to a dog is inputted, the computer will classify it as a dog photo.

There have already been many machine learning algorithms to classify data. For example, a decision tree, a Bayesian network, a support vector machine (SVM), an artificial neural network, etc. have been developed. The deep learning is a descendant of the artificial neural network.

Deep Convolution Neural Networks (Deep CNNs) are the heart of the remarkable development in deep learning. CNNs have already been used in the 90's to solve the problem of character recognition, but their use has become as widespread as it is now thanks to recent research. These deep CNNs won the 2012 ImageNet image classification tournament, crushing other competitors. Then, the convolution neural network became a very useful tool in the field of the machine learning.

FIG. 1 shows an example of various outputs to be acquired from a photograph using a deep CNN according to prior art.

Classification is a method for identifying a type of a class to be acquired from a photograph, for example, as shown in FIG. 1, determining whether an acquired object is a person, a lamb, or a dog. Detection is a method for finding every object and displaying the found object as enclosed in a bounding box. Segmentation is a method for distinguishing a region of a specific object from other objects in a photograph. As the deep learning has recently become popular, the classification, the detection, and the segmentation are using the deep learning heavily.

FIG. 2 is a diagram schematically illustrating a detection method by using the CNN.

By referring to FIG. 2, the learning device receives an input image and applies a plurality of operations to the input image in a plurality of filters (or convolutional layers) to thereby obtain a feature map, then allows the feature map to pass through a detection layer to thereby obtain at least one bounding box, and then allows the bounding box to pass through the filtering layer to thereby obtain a detection result. Then, backpropagation is performed by using a loss value obtained by referring to the detection result and a ground truth (GT) which has been annotated by a person in advance to thereby allow a detector (i.e., the learning device) to gradually make the detection result get closer to the GT.

On the other hand, in consecutive frames (or a plurality of frames close to each other as in the consecutive frames) such as a video, objects at the same or similar locations should be recognized as the same object. However, in case a difference is large between feature values at the same or similar location in the two frames, which are consecutive or close to each other (e.g., two frames when the number of frames existing between the two frames is equal to or less than a threshold number), the object may be successfully detected in one frame but may not be detected in the other frame.

SUMMARY OF THE INVENTION

It is an object of the present invention to solve all the aforementioned problems.

It is another object of the present invention to solve a problem that an object may be successfully detected in one frame but may not be detected in the other frame although the two frames are adjacent to each other.

It is still another object of the present invention to provide a method of making feature values between neighboring frames be similar in a deep neural network.

In accordance with one aspect of the present invention, there is provided a learning method for learning parameters of convolutional neural network (CNN) by using multiple video frames, including steps of: (a) a learning device applying at least one convolutional operation to a (t-k)-th input image corresponding to a (t-k)-th frame and applying at least one convolutional operation to a t-th input image corresponding to a t-th frame following the (t-k)-th frame, to thereby obtain a (t-k)-th feature map corresponding to the (t-k)-th frame and a t-th feature map corresponding to the t-th frame; (b) the learning device calculating a first loss by referring to each of at least one distance value between each of pixels in the (t-k)-th feature map and each of pixels in the t-th feature map; and (c) the learning device backpropagating the first loss to thereby optimize at least one parameter of the CNN.

As one example, at the step of (b), the learning device (i) calculates a (2-1)-th loss based on a difference between a (t-k)-th ground truth (GT) value and a (t-k)-th output value, which is generated by referring to the (t-k)-th feature map, and (ii) calculates a (2-2)-th loss based on a difference between a t-th GT value and a t-th output value, which is generated by referring to the t-th feature map, wherein, at the step of (c), the learning device backpropagates the (2-1)-th loss and the (2-2)-th loss to thereby optimize the parameter of the CNN.

As one example, the first loss is calculated by multiplying (i) each of the at least one distance value between each of the features in the (t-k)-th feature map and each of the features in the t-th feature map and (ii) its corresponding first loss weight, wherein the first loss weight indicates a degree of common region between a receptive field of the (t-k)-th feature map and that of the t-th feature map.

As one example, the first loss (lc) is expressed as an equation below:

$$l_c = \sum_i \sum_j w_{i,j} \phi(f_{t-k}(i), f_t(j)),$$

wherein $f_{t-k}(i)$ represents an i-th feature of the (t-k)-th feature map, $f_t(j)$ represents a j-th feature of the t-th feature map, $\phi(f_{t-k}(i), f_t(j))$ represents a distance between the two features, and $w_{i,j}$ represents its corresponding first loss weight.

As one example, the first loss weight $W_{i,j}$ is expressed as follows: $W_{i,j}$=(the number of pixels connected by optical flows of the two receptive fields of the input images corresponding to the i-th feature of the (t-k)-th feature map and the j-th feature of the t-th feature map)/(the number of pixels in the two receptive fields of the input images corresponding to the i-th feature of the (t-k)-th feature map and the j-th feature of the t-th feature map).

As one example, on condition that the optical flows have included o_forward and o_backward, (I) the o_forward representing an optical flow from the (t-k)-th feature map to the t-th feature map and the o_backward representing an optical flow from the t-th feature map to the (t-k)-th feature map are calculated, then (II) (i) a first number of pixels entering into a receptive field of the t-th input image corresponding to the j-th feature of the t-th feature map among pixels of the receptive field of the (t-k)-th input image corresponding to the i-th feature of the (t-k)-th feature map is calculated by using the o_forward and (ii) a second number of pixels entering into a receptive field of the (t-k)-th input image corresponding to the i-th feature of the (t-k)-th feature map among pixels of the receptive field of the t-th input image corresponding to the j-th feature of the t-th feature map is calculated by using the o_backward, and then (III) the first number of pixels and the second number of pixels are added to thereby obtain the number of pixels connected by the optical flows.

As one example, the learning device includes (i) a first CNN for generating the (t-k)-th feature map and the (t-k)-th output value by using the (t-k)-th input image and (ii) a second CNN for generating the t-th feature map and the t-th output value by using the t-th input image, wherein the second CNN is configured to have the same parameter as that of the first CNN, wherein, at the step of (b), the learning device calculates a second loss by adding the (2-1)-th loss calculated in the first CNN and the (2-2)-th loss calculated in the second CNN, and wherein, at the step of (c), the learning device optimizes the parameter of the first CNN by backpropagating the first loss and the second loss to the first CNN and then reflects the optimized parameter of the first CNN in the parameter of the second CNN.

As one example, at the step of (c), an integrated loss is calculated by using an equation below: the integrated loss=$l_{d(t-k)}+l_{d(t)}+\lambda_c \times l_c$, wherein $l_{d(t-k)}$ represents the (2-1)-th loss, $l_{d(t)}$ represents the (2-2)-th loss, $l_c$ represents the first loss, and $\lambda_c$ is a constant, and wherein the parameter of the CNN is optimized by backpropagating the integrated loss.

As one example, the (t-k)-th output value and the t-th output value are generated by applying at least one deconvolutional operation to the (t-k)-th feature map and the t-th feature map, respectively, wherein the (t-k)-th output and the t-th output are one of object detection and segmentation.

In accordance with another aspect of the present invention, there is provided a testing method for testing convolutional neural network (CNN) for a test image as an input image, including steps of: (a) on condition that (i) a learning device has performed a process of applying at least one convolutional operation to a (t-k)-th training image corresponding to a (t-k)-th frame and applying at least one convolutional operation to a t-th training image corresponding to a t-th frame following the (t-k)-th frame, to thereby obtain a (t-k)-th feature map for training corresponding to the (t-k)-th frame and a t-th feature map for training corresponding to the t-th frame; (ii) the learning device has performed a process of calculating a first loss by referring to each of at least one distance value between each of pixels in the (t-k)-th feature map for training and each of pixels in the t-th feature map for training; and (iii) the learning device has performed a process of backpropagating the first loss to thereby optimize at least one parameter thereof, a testing device obtaining the test image; and (b) the testing device applying at least one predetermined operation to the obtained test image by using the parameter of the CNN to thereby output a result value for testing.

As one example, at the process of (ii), the learning device has calculated a (2-1)-th loss based on a difference between a (t-k)-th ground truth (GT) value and a (t-k)-th output value for training, which is generated by referring to the (t-k)-th feature map for training, and calculates a (2-2)-th loss based on a difference between a t-th GT value and a t-th output value for training, which is generated by referring to the t-th feature map for training, wherein, at the process of (iii), the learning device has optimized the parameter of the CNN by backpropagating the (2-1)-th loss and the (2-2)-th loss.

As one example, the first loss is calculated by multiplying (i) each of the at least one distance value between each of the features in the (t-k)-th feature map and each of the features in the t-th feature map and (ii) its corresponding first loss weight, wherein the first loss weight indicates a degree of common region between a receptive field of the (t-k)-th feature map and that of the t-th feature map.

As one example, the first loss (lc) is expressed as an equation below:

$$l_c = \sum_i \sum_j w_{i,j} \phi(f_{t-k}(i), f_t(j)),$$

wherein $f_{t-k}(i)$ represents an i-th feature of the (t-k)-th feature map, $f_t(j)$ represents a j-th feature of the t-th feature map, $\phi(f_{t-k}(i), f_t(j))$ represents a distance between the two features, and $w_{i,j}$ represents its corresponding first loss weight.

As one example, the first loss weight $W_{i,j}$ is expressed as follows: $W_{i,j}$=(the number of pixels connected by optical flows of the two receptive fields of the input images corresponding to the i-th feature of the (t-k)-th feature map and the j-th feature of the t-th feature map)/(the number of pixels in the two receptive fields of the input images corresponding to the i-th feature of the (t-k)-th feature map and the j-th feature of the t-th feature map).

As one example, on condition that the optical flows have included o_forward and o_backward, (I) the o_forward representing an optical flow from the (t-k)-th feature map to the t-th feature map and the o_backward representing an optical flow from the t-th feature map to the (t-k)-th feature map are calculated, then (II) (i) a first number of pixels entering into a receptive field of the t-th input image corresponding to the j-th feature of the t-th feature map among pixels of the receptive field of the (t-k)-th input image corresponding to the i-th feature of the (t-k)-th feature map is calculated by using the o_forward and (ii) a second number of pixels entering into a receptive field of the (t-k)-th input image corresponding to the i-th feature of the (t-k)-th feature map among pixels of the receptive field of the t-th input image corresponding to the j-th feature of the t-th feature map is calculated by using the o_backward, and then (III) the first number of pixels and the second number of pixels are added to thereby obtain the number of pixels connected by the optical flows.

In accordance with still another aspect of the present invention, there is provided a learning device for learning parameters of convolutional neural network (CNN) by using multiple video frames, including: a communication part for receiving a (t-k)-th input image corresponding to a (t-k)-th frame and a t-th input image corresponding to a t-th frame following the (t-k)-th frame as training images; and a processor for (I) applying at least one convolutional operation to the (t-k)-th input image and applying at least one convolutional operation to the t-th input image, to thereby obtain a (t-k)-th feature map corresponding to the (t-k)-th frame and a t-th feature map corresponding to the t-th frame, (II) calculating a first loss by referring to each of at least one distance value between each of pixels in the (t-k)-th feature map and each of pixels in the t-th feature map, and (III) backpropagating the first loss to thereby optimize at least one parameter of the CNN.

As one example, at the process of (II), the processor (i) calculates a (2-1)-th loss based on a difference between a (t-k)-th ground truth (GT) value and a (t-k)-th output value, which is generated by referring to the (t-k)-th feature map and (ii) calculates a (2-2)-th loss based on a difference between a t-th GT value and a t-th output value, which is generated by referring to the t-th feature map, wherein, at the process of (III), the processor backpropagates the (2-1)-th loss and the (2-2)-th loss to thereby optimize the parameter of the CNN.

As one example, the first loss is calculated by multiplying (i) each of the at least one distance value between each of the features in the (t-k)-th feature map and each of the features in the t-th feature map and (ii) its corresponding first loss weight, wherein the first loss weight indicates a degree of common region between a receptive field of the (t-k)-th feature map and that of the t-th feature map.

As one example, the first loss (lc) is expressed as an equation below:

$$l_c = \sum_i \sum_j w_{i,j} \phi(f_{t-k}(i), f_t(j)),$$

wherein $f_{t-k}(i)$ represents an i-th feature of the (t-k)-th feature map,
$f_t(j)$ represents a j-th feature of the t-th feature map,
$\phi(f_{t-k}(i), f_t(j))$ represents a distance between the two features,
and $w_{i,j}$ represents its corresponding first loss weight.

As one example, the first loss weight $W_{i,j}$ is expressed as follows: $W_{i,j}$=(the number of pixels connected by optical flows of the two receptive fields of the input images corresponding to the i-th feature of the (t-k)-th feature map and the j-th feature of the t-th feature map)/(the number of pixels in the two receptive fields of the input images corresponding to the i-th feature of the (t-k)-th feature map and the j-th feature of the t-th feature map).

As one example, on condition that the optical flows have included o_forward and o_backward, (1) the o_forward representing an optical flow from the (t-k)-th feature map to the t-th feature map and the o_backward representing an optical flow from the t-th feature map to the (t-k)-th feature map are calculated, then (2) (i) a first number of pixels entering into a receptive field of the t-th input image corresponding to the j-th feature of the t-th feature map among pixels of the receptive field of the (t-k)-th input image corresponding to the i-th feature of the (t-k)-th feature map is calculated by using the o_forward and (ii) a second number of pixels entering into a receptive field of the (t-k)-th input image corresponding to the i-th feature of the (t-k)-th feature map among pixels of the receptive field of the t-th input image corresponding to the j-th feature of the t-th feature map is calculated by using the o_backward, and then (3) the first number of pixels and the second number of pixels are added to thereby obtain the number of pixels connected by the optical flows.

As one example, the processor includes (i) a first CNN for generating the (t-k)-th feature map and the (t-k)-output value by using the (t-k)-th input image and (ii) a second CNN for generating the t-th feature map and the t-th output value by using the t-th input image, wherein the second CNN is configured to have the same parameter as that of the first CNN, wherein, at the process of (II), the learning device calculates a second loss by adding the (2-1)-th loss calculated in the first CNN and the (2-2)-th loss calculated in the second CNN, and wherein, at the process of (III), the learning device optimizes the parameter of the first CNN by backpropagating the first loss and the second loss to the first CNN and then reflects the optimized parameter of the first CNN in the parameter of the second CNN.

As one example, at the process of (III), an integrated loss is calculated by using an equation below: the integrated loss=$l_{d(t-k)}+l_{d(t)}+\lambda_c \times l_c$, wherein $l_{d(t-k)}$ represents the (2-1)-th loss, $l_{d(t)}$ represents the (2-2)-th loss, $l_c$ represents the first loss, and $\lambda_c$ is a constant, and wherein the parameter of the learning CNN is optimized by backpropagating the integrated loss.

As one example, the (t-k)-th output value and the t-th output value are generated by applying at least one deconvolutional operation to the (t-k)-th feature map and the t-th feature map, respectively, wherein the (t-k)-th output and the t-th output are one of object detection and segmentation.

In accordance with still yet another aspect of the present invention, there is provided a testing device for testing convolutional neural network (CNN) for a test image as an input image, including: a communication part for, on condition that (i) a learning device has performed a process of applying at least one convolutional operation to a (t-k)-th training image corresponding to a (t-k)-th frame and applying at least one convolutional operation to a t-th training image corresponding to a t-th frame following the (t-k)-th frame, to thereby obtain a (t-k)-th feature map for training corresponding to the (t-k)-th frame and a t-th feature map for training corresponding to the t-th frame; (ii) the learning device has performed a process of calculating a first loss by referring to each of at least one distance value between each of pixels in the (t-k)-th feature map for training and each of pixels in the t-th feature map for training; and (iii) the learning device has performed a process of backpropagating the first loss to thereby optimize at least one parameter thereof, obtaining the test image; and a processor for applying at least one predetermined operation to the obtained test image by using the parameter of the learned learning CNN to thereby output a result value for testing.

As one example, at the process of (ii), the learning device has calculated a (2-1)-th loss based on a difference between a (t-k)-th ground truth (GT) value and a (t-k)-th output value for training, which is generated by referring to the (t-k)-th feature map for training, and calculates a (2-2)-th loss based on a difference between a t-th GT value and a t-th output value for training, which is generated by referring to the t-th feature map for training, wherein, at the process of (iii), the learning device has optimized the parameter of the learning CNN by backpropagating the (2-1)-th loss and the (2-2)-th loss.

As one example, the first loss is calculated by multiplying (i) each of the at least one distance value between each of the features in the (t-k)-th feature map and each of the features in the t-th feature map and (ii) its corresponding first loss weight, wherein the first loss weight indicates a degree of common region between a receptive field of the (t-k)-th feature map and that of the t-th feature map.

As one example, the first loss (lc) is expressed as an equation below:

$$l_c = \sum_i \sum_j w_{i,j} \phi(f_{t-k}(i), f_t(j)),$$

wherein $f_{t-k}(i)$ represents an i-th feature of the (t-k)-th feature map, $f_t(j)$ represents a j-th feature of the t-th feature map, $\phi(f_{t-k}(i), f_t(j))$ represents a distance between the two features, and $w_{i,j}$ represents its corresponding first loss weight.

As one example, the first loss weight $W_{i,j}$ is expressed as follows: $W_{i,j}$=(the number of pixels connected by optical flows of the two receptive fields of the input images corresponding to the i-th feature of the (t-k)-th feature map and the j-th feature of the t-th feature map)/(the number of pixels in the two receptive fields of the input images corresponding to the i-th feature of the (t-k)-th feature map and the j-th feature of the t-th feature map).

As one example, on condition that the optical flows have included o_forward and o_backward, (I) the o_forward representing an optical flow from the (t-k)-th feature map to the t-th feature map and the o_backward representing an optical flow from the t-th feature map to the (t-k)-th feature map are calculated, then (II) (i) a first number of pixels entering into a receptive field of the t-th input image corresponding to the j-th feature of the t-th feature map among pixels of the receptive field of the (t-k)-th input image corresponding to the i-th feature of the (t-k)-th feature map is calculated by using the o_forward and (ii) a second number of pixels entering into a receptive field of the (t-k)-th input image corresponding to the i-th feature of the (t-k)-th feature map among pixels of the receptive field of the t-th input image corresponding to the j-th feature of the t-th feature map is calculated by using the o_backward, and then (III) the first number of pixels and the second number of pixels are added to thereby obtain the number of pixels connected by the optical flows.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
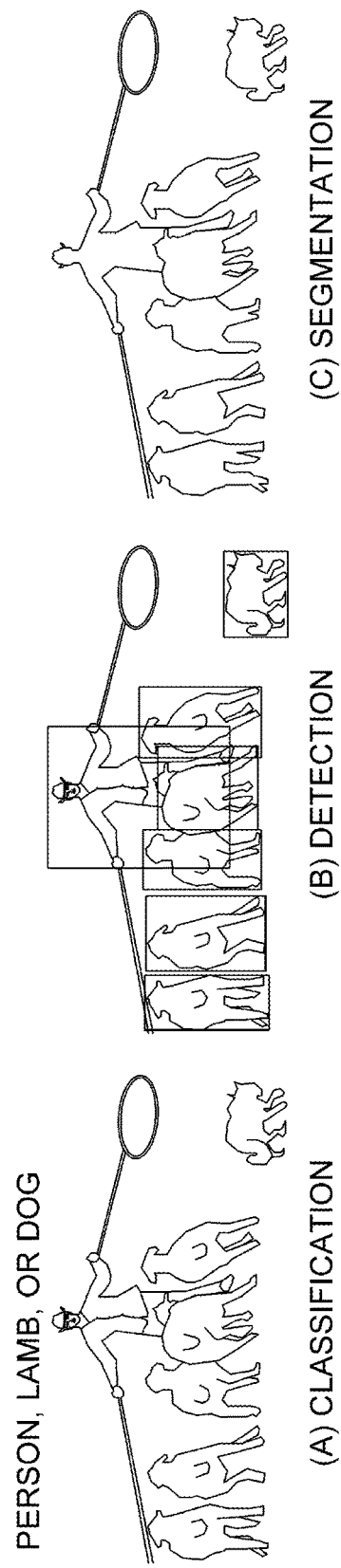
FIG. 1 is a drawing schematically illustrating an example of various outputs acquired from a photograph using a conventional CNN.
Figure 2:
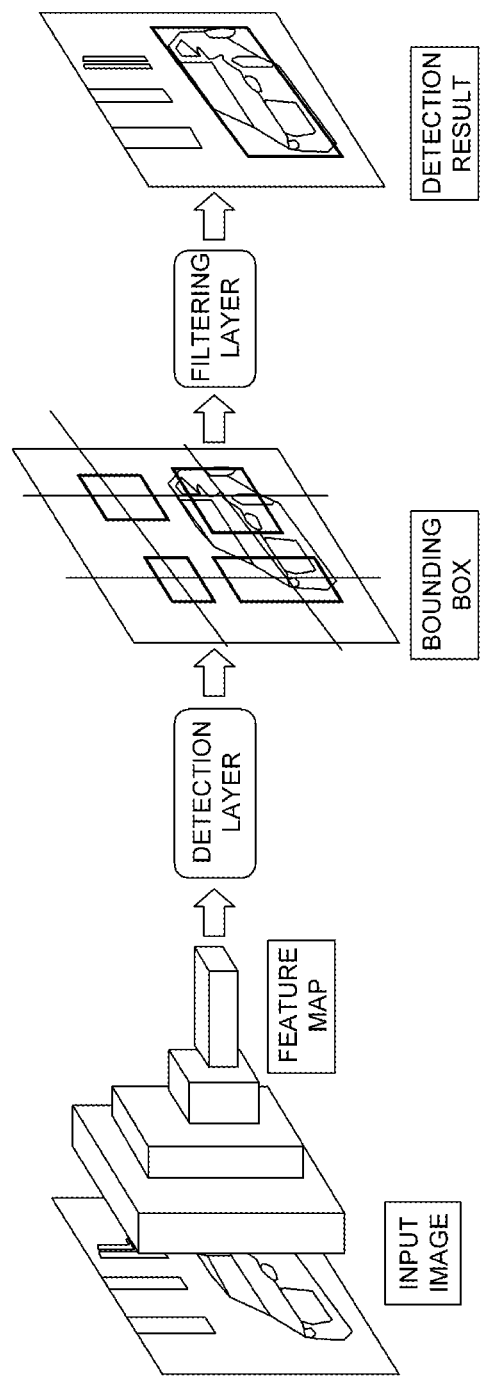
FIG. 2 is a diagram schematically illustrating a detection method by using the conventional CNN.

Detailed explanations of the present invention explained below refer to attached drawings that illustrate specific embodiment examples of this present that may be executed. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To make it easy for those who have common knowledge in the art to which the present invention pertains to implement the present invention, detailed explanation on desirable embodiment examples of the present invention will be made by referring to attached drawings.

In the present specification, "neighboring frames" and "consecutive frames" do not necessarily mean physically immediately neighboring frames and may mean two frames which can be regarded as consecutive. For example, if the number of frames existing between the two frames is equal to or less than a threshold number, the two frames may be regarded as the "consecutive frames".

Figure 3:
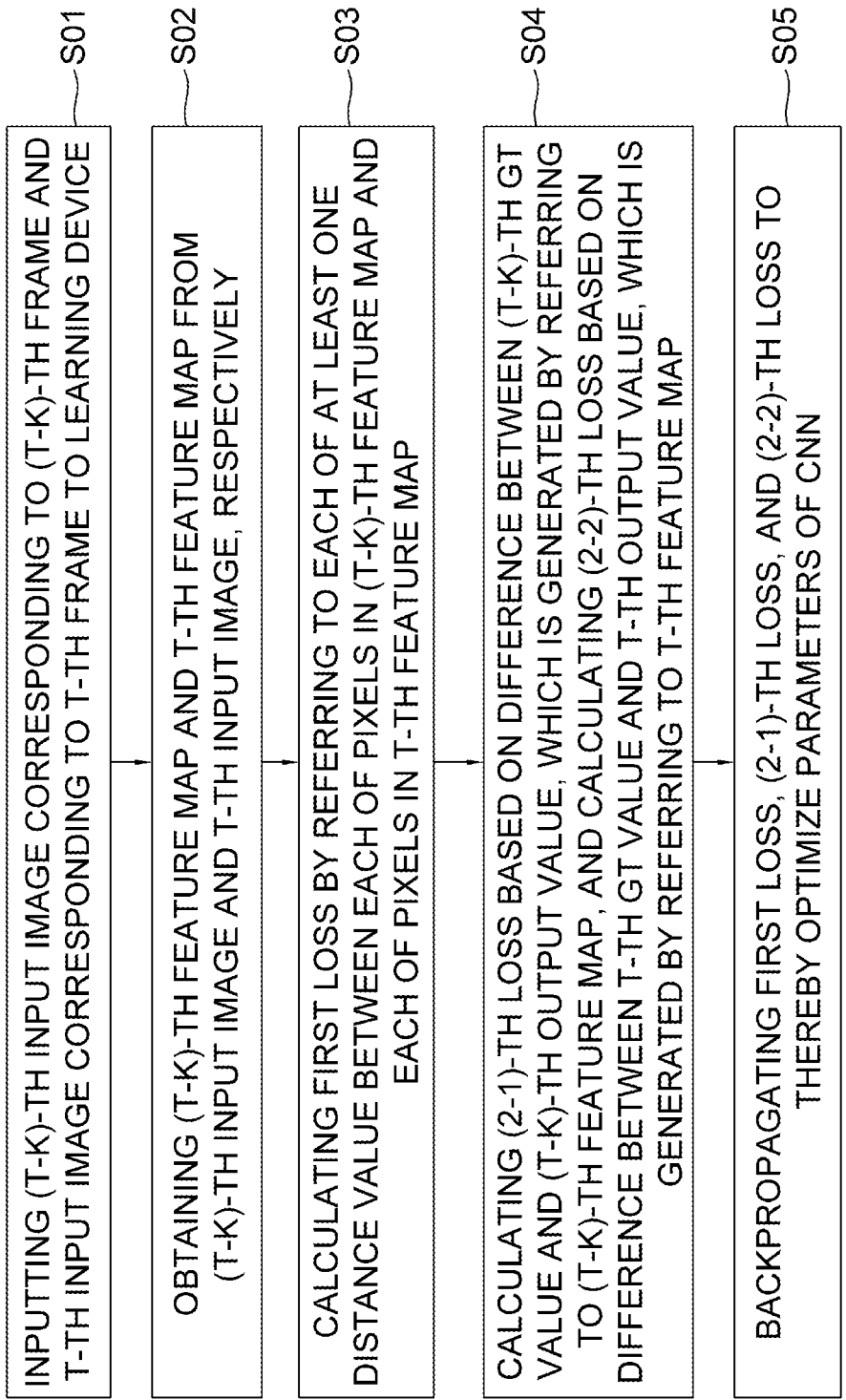
FIG. 3 is a flowchart illustrating a method for learning parameters of a convolutional neural network (CNN) by using multiple video frames in accordance with the present invention.

FIG. 3 is a flowchart illustrating a method for learning parameters of a convolutional neural network (CNN) by using multiple video frames in accordance with the present invention.

Referring to FIG. 3, a method for learning convolutional neural network (CNN) in accordance with the present invention includes a step S01 of inputting a (t-k)-th input image corresponding to a (t-k)-th frame and a t-th input image corresponding to a t-th frame to a learning device, a step S02 of obtaining a (t-k)-th feature map and a t-th feature map from the (t-k)-th input image and the t-th input image, respectively, a step S03 of calculating a first loss by referring to each of at least one distance value between each of pixels in the (t-k)-th feature map and each of pixels in the t-th feature map, a step S04 of calculating a (2-1)-th loss based on a difference between a (t-k)-th ground truth (GT) value and a (t-k)-th output value, which is generated by referring to the (t-k)-th feature map, and calculating a (2-2)-th loss based on a difference between a t-th GT value and a t-th output value, which is generated by referring to the t-th feature map, and a step S05 of backpropagating the first loss, the (2-1)-th loss, and the (2-2)-th loss to thereby optimize the parameters of the CNN. Here, "k" may be 1, but the present invention is not limited to this example.

Figure 4:
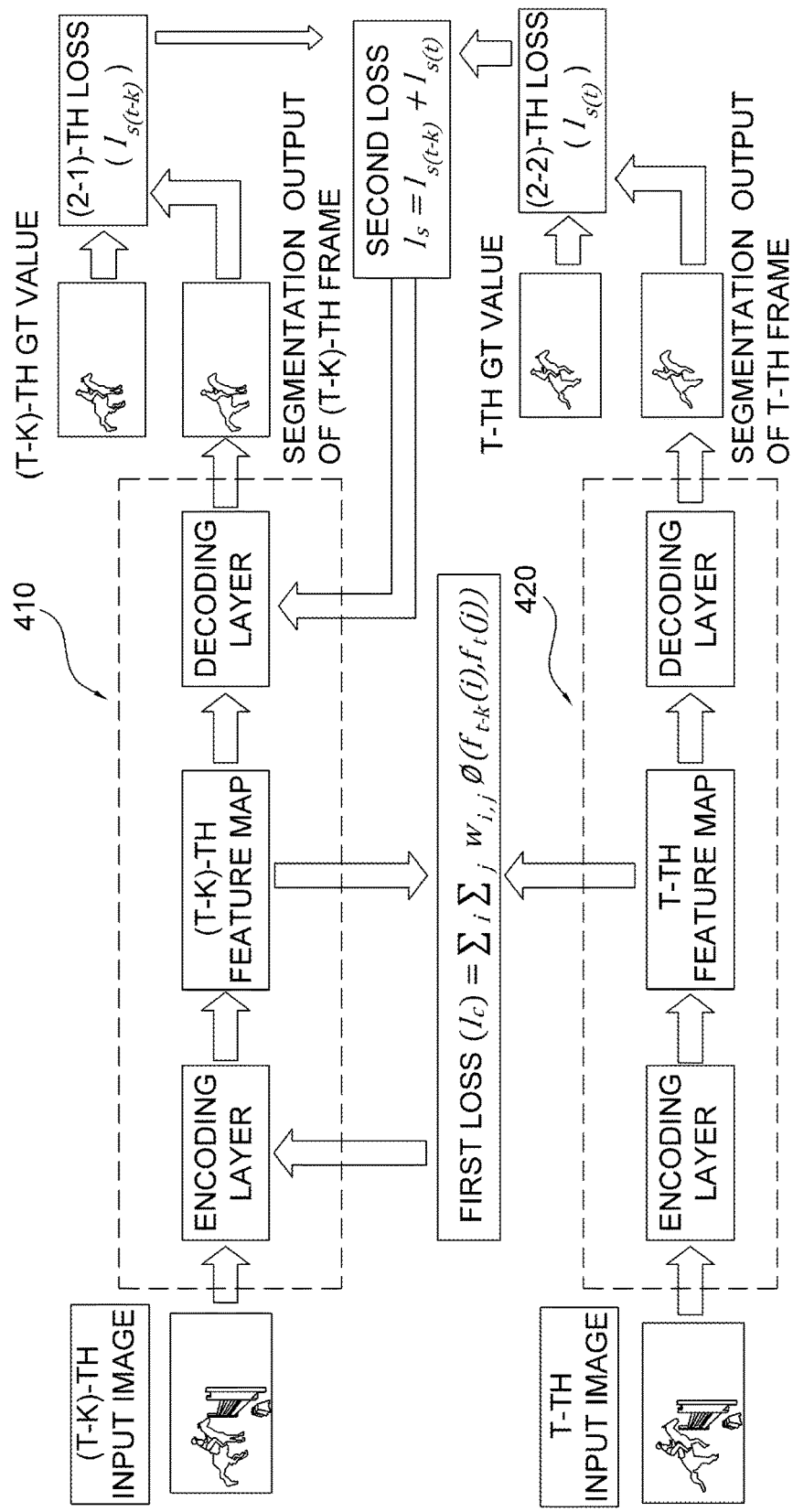
FIG. 4 is a diagram illustrating a process of learning the parameters of the CNN capable of segmenting the multiple video frames provided as input images in accordance with the present invention.
Figure 5:
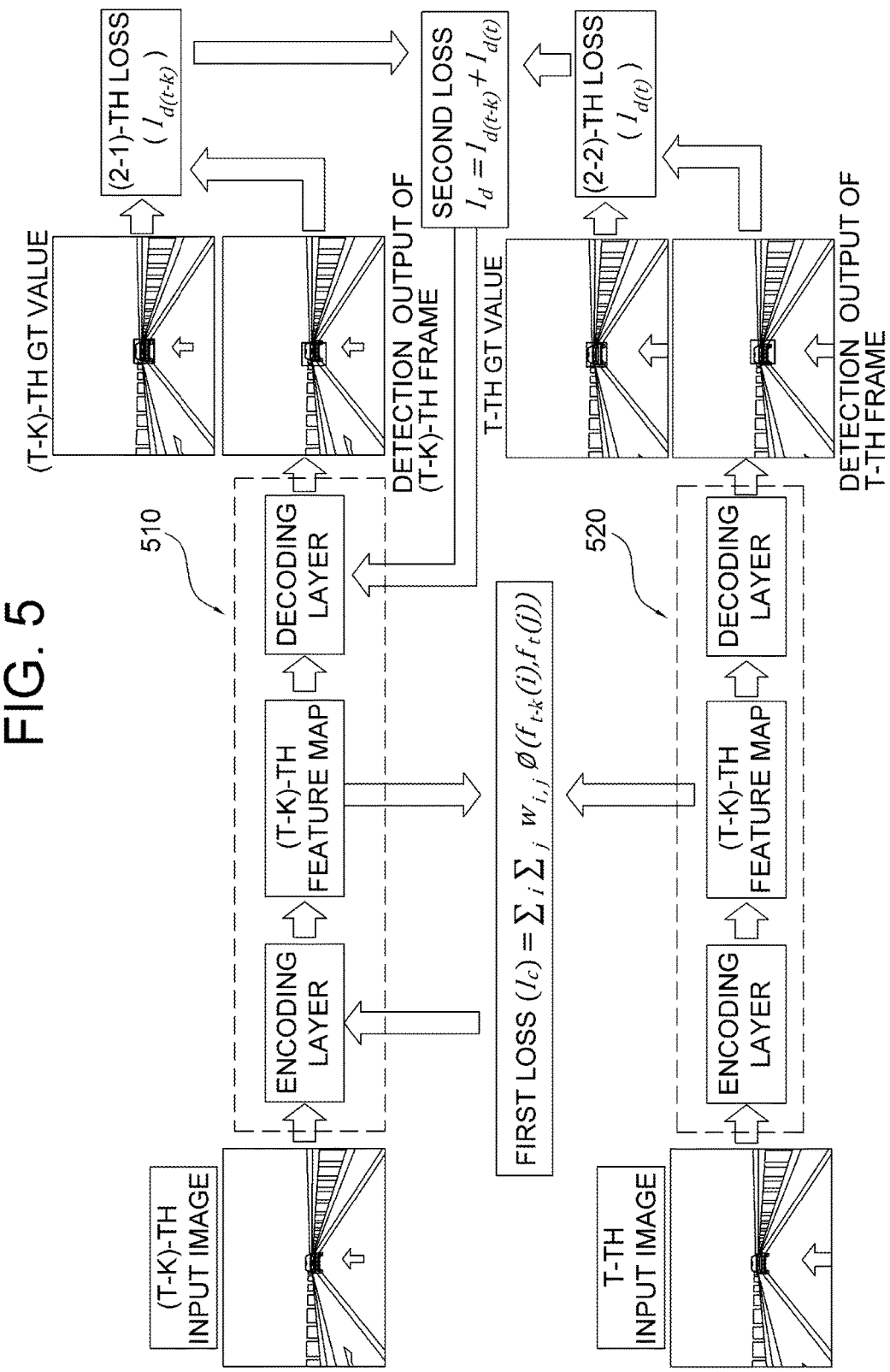
FIG. 5 is a diagram illustrating a process of learning the parameters of the CNN capable of detecting objects in the multiple video frames provided as the input images in accordance with the present invention.

FIG. 4 is a diagram illustrating a process of learning the parameters of the CNN capable of segmenting the multiple video frames provided as the input images in accordance with the present invention, and FIG. 5 is a process of learning the parameters of the CNN capable of detecting objects in the multiple video frames provided as the input images in accordance with the present invention.

Hereinafter, the process of learning the CNN for segmentation or detection, in such a manner that feature values of the consecutive frames can become similar to each other, will be specifically described by referring to FIGS. 4 and 5.

First of all, at the step S01 of inputting the (t-k)-th input image corresponding to the (t-k)-th frame and the t-th input image corresponding to the t-th frame to the learning device, the learning device receives the (t-k)-th input image corresponding to the (t-k)-th frame and the t-th input image corresponding to the t-th frame following the (t-k)-th frame as training images. Herein, the (t-k)-th frame and the t-th frame may be frames included in one video.

At the step S02 of obtaining the (t-k)-th feature map and the t-th feature map from the (t-k)-th input image and the t-th input image, respectively, the learning device applies at least one convolutional operation to the (t-k)-th input image and the t-th input image, to thereby obtain the (t-k)-th feature map corresponding to the (t-k)-th frame and the t-th feature map corresponding to the t-th frame as illustrated in FIGS. 4 and 5.

Herein, by referring to FIGS. 4 and 5, the learning device includes (i) a first CNN 410, 510 for obtaining the (t-k)-th feature map and the (t-k)-output value by using the (t-k)-th input image and (ii) a second CNN 420, 520 for obtaining the t-th feature map and the t-th output value by using the t-th input image. In detail, the second CNN may be configured to have the same parameter as that of the first CNN. Further, in another example embodiment of the present invention, a single CNN applies at least one convolutional operation to the (t-k)-th input image to thereby obtain the (t-k)-th feature map corresponding to the (t-k)-th frame, and then applies at least one convolutional operation to the t-th input image to thereby obtain the t-th feature map corresponding to the t-th frame in consecutive order.

At the step S03 of calculating the first loss by referring to each of at least one distance value between each of pixels in the (t-k)-th feature map and each of pixels in the t-th feature map, the first loss (a so-called continuity loss $l_c$) is calculated by multiplying (i) each of the at least one distance value between each of the features in the (t-k)-th feature map and each of the features in the t-th feature map and (ii) its corresponding first loss weight, wherein the first loss weight indicates a degree of common region between a receptive field of the (t-k)-th feature map and that of the t-th feature map.

Generally, the learning process is merely performed to reduce a segmentation loss $l_s$ in case the CNN is learned for the segmentation and to reduce a detection loss $l_d$ in case the CNN is learned for the object detection. However, in accordance with the present invention, features of the same object included in consecutive frames are set to have similar values by adding the continuity loss $l_c$.

In an example embodiment of the present invention, the continuity loss $l_c$ may be expressed as an equation below.

$$l_c = \sum_i \sum_j w_{i,j} \phi(f_{t-k}(i), f_t(j)) \qquad \text{[Equation 1]}$$

Herein, $f_{t-k}(i)$ represents an i-th feature of the (t-k)-th feature map, $f_t(j)$ represents a j-th feature of the t-th feature map, $\phi(f_{t-k}(i), f_t(j))$ represents a distance between the two features, and $w_{i,j}$ represents its corresponding first loss weight.

Herein, the first loss weight $w_{i,j}$ may be defined as follows:

$W_{i,j}$=(the number of pixels connected by optical flows of two receptive fields of actual input images corresponding to the i-th feature of the (t-k)-th feature map and the j-th feature of the t-th feature map)/(the number of pixels in the two receptive fields of the actual input images corresponding to the i-th feature of the (t-k)-th feature map and the j-th feature of the t-th feature map).

Hereinafter, the first loss weight will be specifically described by referring to FIGS. 6 and 7.

Figure 6:
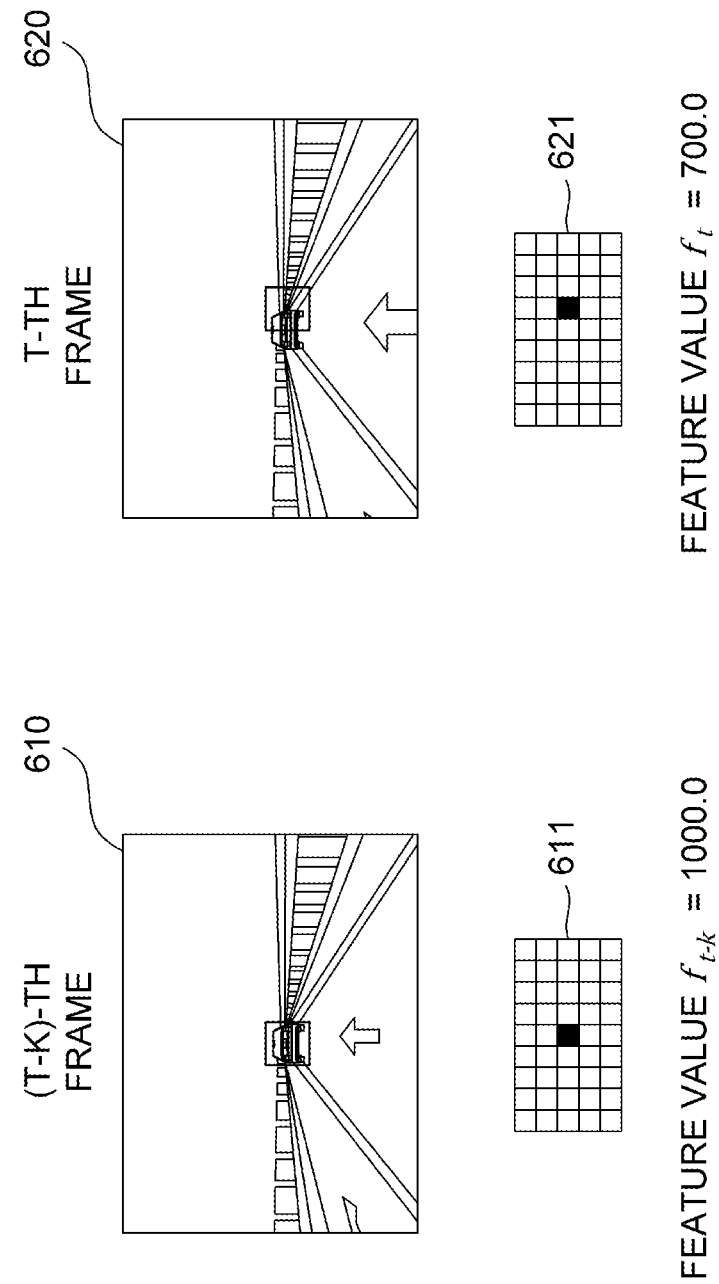
FIG. 6 is a diagram illustrating a receptive field.
Figure 7:
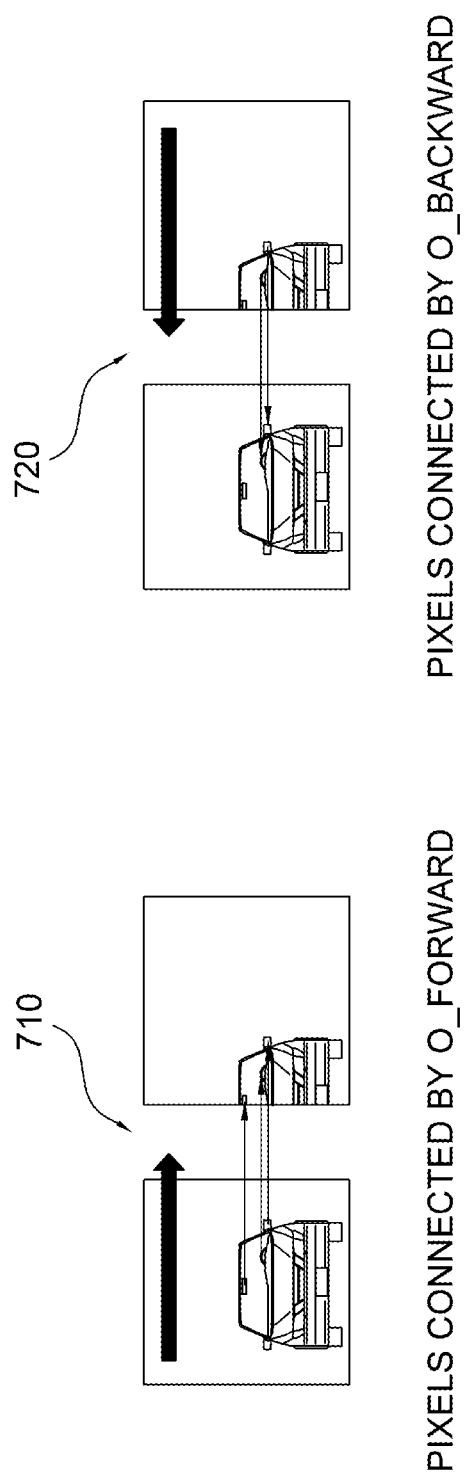
FIG. 7 is a diagram illustrating optical flows.

FIG. 6 is a diagram illustrating a receptive field, and FIG. 7 is a diagram illustrating the optical flows.

Each feature has its corresponding receptive field as illustrated in FIG. 6. The receptive field means a pixel area used to calculate its corresponding feature in an image. A reference number 610 represents the (t-k)-th frame and a small box shown in the (t-k)-th frame represents a pixel area used to calculate a particular feature (a feature of a black portion of the (t-k)-th feature map 611). A reference number 620 represents the t-th frame and a small box shown in the t-th frame represents a pixel area used to calculate a particular feature (a feature of a black portion of the t-th feature map 621).

Herein, the first loss weight $W_{i,j}$ is calculated by using a degree of common region between a receptive field of the (t-k)-th feature map and that of the t-th feature map. In detail, the equation 1 is designed in such a manner that the first loss weight $W_{i,j}$ gets closer to 1 as the common region increases, and the first loss weight $W_{i,j}$ gets closer to 0 as the common region decreases. For example, on condition that a feature value corresponding to the black portion of the (t-k)-th feature map 611 is 1000.0, a feature value corresponding to the black portion of the t-th feature map 612 is 700.0, if the two receptive fields overlap by 30%, the distance $\phi(f_{t-k}(i), f_t(j))$ between the two features becomes 1000−700=300, and the first loss weight $w_{i,j}$ indicating the similarity between the two receptive fields becomes 0.3. Hence, in the process of calculating the continuity loss (the first loss), the similarity $w_{i,j}\phi(f_{t-k}(i), f_c(j))$ between the i-th feature of the (t-k)-th feature map and the j-th feature of the t-th feature map becomes 0.3*(1000−700)=90. In addition, the continuity loss (the first loss) is calculated by adding $w_{i,j}\phi(f_{t-k}(i), f_t(j))$ for all features between the two feature maps.

Hereinafter, the process of calculating the first loss weight $w_{i,j}$ will be described in detail by referring to FIG. 7.

As described above, $W_{i,j}$ is defined as (the number of pixels connected by the optical flows)/(the number of pixels in the two receptive fields). Herein, in order to calculate the number of pixels connected by the optical flows, a forward optical flow (o_forward) from the (t-k)-th frame to the t-th frame shown as a reference number 710 and a backward optical flow (o_backward) from the t-th frame to the (t-k)-th frame shown as a reference number 720 are calculated. Then it is checked which pixels of the t-th frame are matched with the pixels of the (t-k)-th frame by using the o_forward, and the number of pixels included in the receptive field of $f_t(j)$ (the j-th feature of the t-th feature map) among the matched pixels is calculated. Then the number of pixels matched in the receptive field of $f_t(j)$ is calculated in the same manner as the o_backward. The sum of the two pixel numbers is the number of pixels connected by the optical flows.

Namely, (i) a first number of pixels entering into a receptive field of the t-th input image corresponding to the j-th feature of the t-th feature map among pixels of the receptive field of the (t-k)-th input image corresponding to the i-th feature of the (t-k)-th feature map is calculated by using the o_forward and (ii) a second number of pixels entering a receptive field of the (t-k)-th input image corresponding to the i-th feature of the (t-k)-th feature map among pixels of the receptive field of the t-th input image corresponding to the j-th feature of the t-th feature map is calculated by using the o_backward, and then (iii) the first pixel number and the second pixel number are added to thereby obtain the number of pixels connected by the optical flows.

On condition that the continuity loss (continuity loss $l_c$) is calculated in the above manner, as the distance between the features of the two feature maps increases and the similarity between the receptive fields increases, the continuity loss also increases. Namely, when the receptive fields of the two feature maps are similar to each other, as the feature distance decreases, the loss also decreases. When the receptive fields of the two feature maps are not similar to each other, the continuity loss is not influenced by a value of the feature distance.

Referring to FIG. 3 again, the (2-1)-th loss is calculated based on the difference between the (t-k)-th ground truth (GT) value and the (t-k)-th output value, which is generated by referring to the (t-k)-th feature map, and the (2-2)-th loss is calculated based on the difference between the t-th GT value and the t-th output value, which is generated by referring to the t-th feature map, at the step of S04. At the step of S04, as illustrated in FIGS. 4 and 5, if the CNN is a segmentation network, the (t-k)-th output value generated through a predetermined number of deconvolutional operations becomes the segmentation output of the (t-k)-th frame, and the (2-1)-th loss is calculated by referring to the segmentation output of the (t-k)-th frame and the (t-k)-th GT value. In FIG. 4, the segmentation output of (t-k)-th frame has roughly segmented boundaries of the objects while the (t-k)-th GT value has almost exact boundaries. The t-th output value becomes the segmentation output of the t-th frame, and the (2-2)-th loss is calculated by referring to the segmentation output of the t-th frame and the t-th GT value. In FIG. 4, the segmentation output of the t-th frame has roughly segmented boundaries of the objects while the t-th GT value has almost exact boundaries. If the CNN is an object detect network, the (t-k)-th output value generated through a predetermined number of deconvolutional operations becomes the detection output of the (t-k)-th frame, and the (2-1)-th loss is calculated by referring to the detection output of the (t-k)-th frame and the (t-k)-th GT value. In FIG. 5, the detection output of the (t-k)-th frame has a less tight bounding box than the (t-k)-th GT value has. The t-th output value becomes the detection output of the t-th frame, and the (2-2)-th loss is calculated by referring to the detection output of the t-th frame and the t-th GT value. In FIG. 5, the detection output of the t-th frame has a less tight bounding box than the t-th GT value has.

Herein, the (2-1)-th loss may be calculated in the first CNN, and the (2-2)-th loss may be calculated in the second CNN. If there is only one CNN, the learning device may first calculate the (t-k)-th output value and the (2-1)-th loss, and then calculate the t-th output value and the (2-2)-th loss in consecutive order.

In accordance with another example embodiment of the present invention, the learning device may calculate a second loss by adding the (2-1)-th loss calculated in the first CNN and the (2-2)-th loss calculated in the second CNN. In FIG. 4, the second loss $l_s$ is calculated by adding the (2-1)-th segmentation loss $l_{s(t-k)}$ and the (2-2)-th segmentation loss $l_{s(t)}$. In FIG. 5, the second loss $l_d$ is calculated by adding a (2-1)-th detection loss $l_{d(t-k)}$ and the (2-2)-th detection loss $l_{d(t)}$.

In addition, the step S05 of backpropagating the first loss, the (2-1)-th loss, and the (2-2)-th loss to thereby optimize the parameters of the CNN may be performed. At the step of S05, the parameters of the encoding layer of the first CNN are optimized by backpropagating the continuity loss $l_c$ through the encoding layer of the first CNN, and the parameters of the encoding layer and the decoding layer of the first CNN are optimized by backpropagating the sum of the (2-1)-th segmentation loss $l_{s(t-k)}$ and the (2-2)-th segmentation loss $l_{s(t)}$ or the sum of the (2-1)-th detection loss $l_{d(t-k)}$ and the (2-2)-th detection loss $l_{d(t)}$ through the decoding layer and the encoding layer of the first CNN. Further, the optimized parameters of the first CNN are reflected on the parameters of the second CNN.

In accordance with still another example embodiment of the present invention, the (2-1)-th loss may be used for the optimization of the first CNN, and the (2-2)-th loss may be used for the optimization of the second CNN, but it is preferred that the first CNN and the second CNN are optimized in the same manner. Since the first loss (continuity loss) is commonly calculated, only one CNN may be learned, which may then be reflected on the other CNN. Namely, the parameters of the first CNN may be optimized by backpropagating the (2-1)-th segmentation loss $l_{s(t-k)}$ or the (2-1)-th detection loss $l_{d(t-k)}$ through the decoding layer and the encoding layer of the first CNN, and then the optimized parameters of the first CNN may be reflected on those of the second CNN. Further, as still yet another example, the parameters of the first CNN may be optimized by backpropagating the (2-1)-th segmentation loss $l_{s(t-k)}$ or the (2-1)-th detection loss $l_{d(t-k)}$ through the decoding layer and the encoding layer of the first CNN and the parameters of the second CNN may be optimized by backpropagating the (2-2)-th segmentation loss $l_{s(t)}$ or the (2-2)-th detection loss $l_{d(t)}$ through the decoding layer and the encoding layer of the second CNN.

Further, in accordance with still yet another example embodiment of the present invention, the first loss, the (2-1)-th loss, and the (2-2)-th loss may be used to generate an integrated loss through an equation below.

$$\text{the integrated loss} = l_{d(t-k)} + l_{d(t)} + \lambda_c \times l_c \quad \text{[Equation 2]}$$

Herein, $l_{d(t-k)}$ represents the (2-1)-th loss, $l_{d(t)}$ represents the (2-2)-th loss, $l_c$ represents the first loss, and $\lambda_c$ is a constant.

Herein, the parameters of the first CNN may be optimized by backpropagating the integrated loss through the first CNN.

If the parameters of the CNNs are optimized through such a learning process, a testing device uses the CNNs with the optimized parameters.

Figure 8:
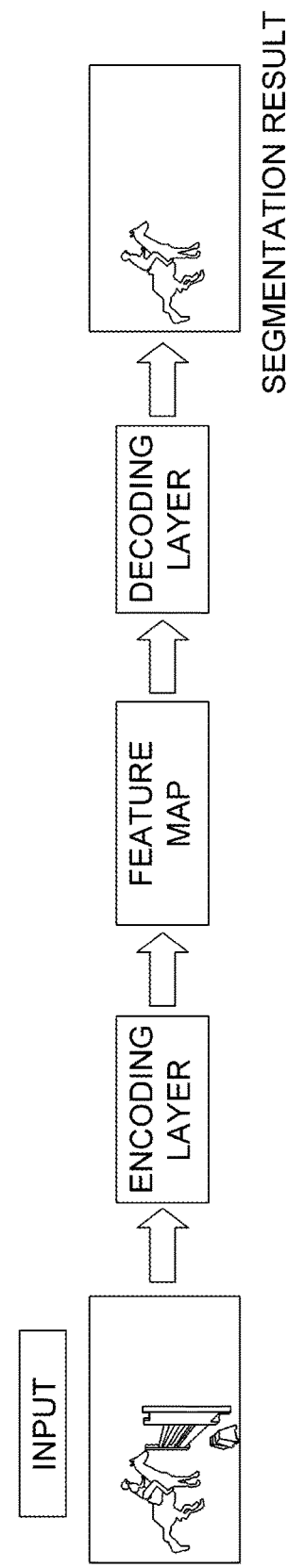
FIG. 8 is a diagram illustrating a testing process for segmentation by using parameters of the CNN obtained through the learning process of FIG. 4.
Figure 9:
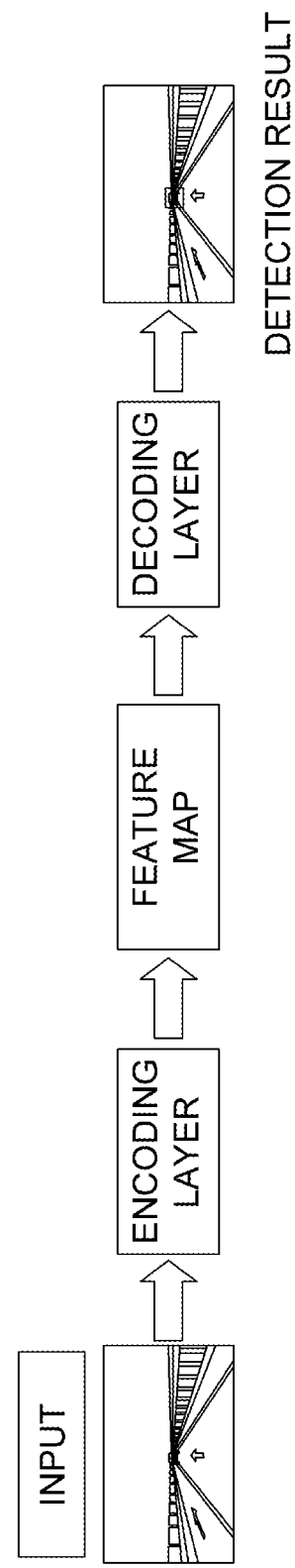
FIG. 9 is a diagram illustrating a testing process for detection by using parameters of the CNN obtained through the learning process of FIG. 4.

A configuration of the testing device may be acquired by removing the above-mentioned loss calculation parts as illustrated in FIGS. 8 and 9.

FIGS. 8 and 9 illustrate processes of the testing device to which only one image is inputted, but the testing device may receive consecutive frames such as a video in order to obtain the segmentation result or the detection result from each image. Herein, the deep neural network in accordance with the present invention may enable the feature values between the neighboring frames to become similar to each other to thereby continually detect the certain object included in the neighboring frames without fail. In addition, in accordance with the present invention, the feature values between the neighboring frames are maintained to be similar to each other by obtaining the optical flows between the two neighboring frames, thereby increasing the performance of the object detection between the frames.

It would be understood by one of ordinary skill in the art that transmission/reception of the above-described images, i.e., image data such as a training image and a test image, can be performed by communication units of the learning device and the testing device, and that the processes of the convolutional operation, the deconvolutional operation and the loss value operation can be mainly performed by the processor of the learning device and the testing device, but the present invention is not limited to these examples.

The present invention has an effect of making the feature values between the neighboring frames be similar to each other to thereby prevent a situation in which a detection of a certain object succeeds in a frame but the detection of the same object at the same location fails in its neighboring frame.

The present invention has another effect of obtaining the optical flows of the two neighboring frames to thereby reduce the difference between the features of the two neighboring frames, thereby increasing the performance of the object detection between the two neighboring frames.

The objects of the technical solution of the present invention or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a compiler but also a high-level code that can be used by an interpreter etc., which is executed by a computer. The aforementioned hardware devices can work as more than a software module to perform the action of the present invention and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A learning method for learning parameters of convolutional neural network (CNN) by using multiple video frames, comprising steps of:
   (a) a learning device applying at least one convolutional operation to a (t-k)-th input image corresponding to a (t-k)-th frame and applying at least one convolutional operation to a t-th input image corresponding to a t-th frame following the (t-k)-th frame, to thereby obtain a (t-k)-th feature map corresponding to the (t-k)-th frame and a t-th feature map corresponding to the t-th frame;
   (b) the learning device calculating a first loss by referring to each of at least one distance value between each of pixels in the (t-k)-th feature map and each of pixels in the t-th feature map; and
   (c) the learning device backpropagating the first loss to thereby optimize at least one parameter of the CNN, wherein
   the first loss is calculated by multiplying (i) each of the at least one distance value between each of the features in the (t-k)-th feature map and each of the features in the t-th feature map and (ii) its corresponding first loss weight, and
   the first loss weight determines the contribution of the first loss term and is based on a degree of common region between a receptive field of the (t-k)-th feature map and that of the t-th feature map.

2. The learning method of claim 1, wherein, at the step of (b), the learning device (i) calculates a (2-1)-th loss based on a difference between a (t-k)-th ground truth (GT) value and a (t-k)-th output value, which is generated by referring to the (t-k)-th feature map, and (ii) calculates a (2-2)-th loss based on a difference between a t-th GT value and a t-th output value, which is generated by referring to the t-th feature map,
   wherein, at the step of (c), the learning device backpropagates the (2-1)-th loss and the (2-2)-th loss to thereby optimize the parameter of the CNN.

3. The learning method of claim 1, wherein the first loss (lc) is expressed as an equation below:

$$l_c = \sum_i \sum_j w_{i,j} \phi(f_{t-k}(i), f_t(j)),$$

wherein $f_{t-k}(i)$ represents an i-th feature of the (t-k)-th feature map, $f_t(j)$ represents a j-th feature of the t-th feature map, $\phi(f_{t-k}(i), f_t(j))$ represents a distance between the two features, and $w_{i,j}$ represents its corresponding first loss weight.

4. The learning method of claim 3, wherein the first loss weight $W_{i,j}$ is expressed as follows:
$W_{i,j}$=(the number of pixels connected by optical flows of the two receptive fields of the input images corresponding to the *i*-th feature of the (*t-k*)-th feature map and the *j*-th feature of the *t*-th feature map)/(the number of pixels in the two receptive fields of the input images corresponding to the *i*-th feature of the (*t-k*)-th feature map and the *j*-th feature of the *t*-th feature map).

5. The learning method of claim 4, wherein, on condition that the optical flows have included o_forward and o_backward, (I) the o_forward representing an optical flow from the (t-k)-th feature map to the t-th feature map and the o_backward representing an optical flow from the t-th feature map to the (t-k)-th feature map are calculated, then (II) (i) a first number of pixels entering into a receptive field of the t-th input image corresponding to the j-th feature of the t-th feature map among pixels of the receptive field of the (t-k)-th input image corresponding to the i-th feature of the (t-k)-th feature map is calculated by using the o_forward and (ii) a second number of pixels entering into a receptive field of the (t-k)-th input image corresponding to the i-th feature of the (t-k)-th feature map among pixels of the receptive field of the t-th input image corresponding to the j-th feature of the t-th feature map is calculated by using the o_backward, and then (III) the first number of pixels and the second number of pixels are added to thereby obtain the number of pixels connected by the optical flows.

6. The learning method of claim 2, wherein the learning device includes (i) a first CNN for generating the (t-k)-th feature map and the (t-k)-output value by using the (t-k)-th input image and (ii) a second CNN for generating the t-th feature map and the t-th output value by using the t-th input image,
wherein the second CNN is configured to have the same parameter as that of the first CNN,
wherein, at the step of (b), the learning device calculates a second loss by adding the (2-1)-th loss calculated in the first CNN and the (2-2)-th loss calculated in the second CNN, and
wherein, at the step of (c), the learning device optimizes the parameter of the first CNN by backpropagating the first loss and the second loss to the first CNN and then reflects the optimized parameter of the first CNN in the parameter of the second CNN.

7. The learning method of claim 2, wherein, at the step of (c), an integrated loss is calculated by using an equation below:

the integrated loss=$l_{d(t-k)} + l_{d(t)} + \lambda_c \times l_c$, wherein $l_{d(t-k)}$ represents the (2-1)-th loss, $l_{d(t)}$ represents the (2-2)-th loss, $l_c$ represents the first loss, and $\lambda_c$ is a constant, and wherein the parameter of the CNN is optimized by backpropagating the integrated loss.

8. The learning method of claim 2, wherein the (t-k)-th output value and the t-th output value are generated by applying at least one deconvolutional operation to the (t-k)-th feature map and the t-th feature map, respectively,
wherein the (t-k)-th output and the t-th output are one of object detection and segmentation.

9. A testing method for testing convolutional neural network (CNN) for a test image as an input image, comprising steps of:
(a) on condition that (i) a learning device has performed a process of applying at least one convolutional operation to a (t-k)-th training image corresponding to a (t-k)-th frame and applying at least one convolutional operation to a t-th training image corresponding to a t-th frame following the (t-k)-th frame, to thereby obtain a (t-k)-th feature map for training corresponding to the (t-k)-th frame and a t-th feature map for training corresponding to the t-th frame; (ii) the learning device has performed a process of calculating a first loss by referring to each of at least one distance value between each of pixels in the (t-k)-th feature map for training and each of pixels in the t-th feature map for training; and (iii) the learning device has performed a process of backpropagating the first loss to thereby optimize at least one parameter thereof, a testing device obtaining the test image; and
(b) the testing device applying at least one predetermined operation to the obtained test image by using the parameter of the CNN to thereby output a result value for testing, wherein
the first loss is calculated by multiplying (1) each of the at least one distance value between each of the features in the (t-k)-th feature map and each of the features in the t-th feature map and (2) its corresponding first loss weight, and
the first loss weight determines the contribution of the first loss term and is based on a degree of common region between a receptive field of the (t-k)-th feature map and that of the t-th feature map.

10. The testing method of claim 9, wherein, at the process of (ii), the learning device has calculated a (2-1)-th loss based on a difference between a (t-k)-th ground truth (GT) value and a (t-k)-th output value for training, which is generated by referring to the (t-k)-th feature map for training, and calculates a (2-2)-th loss based on a difference between a t-th GT value and a t-th output value for training, which is generated by referring to the t-th feature map for training,
wherein, at the process of (iii), the learning device has optimized the parameter of the CNN by backpropagating the (2-1)-th loss and the (2-2)-th loss.

11. The testing method of claim 9, wherein the first loss (lc) is expressed as an equation below:

$$l_c = \sum_i \sum_j w_{i,j} \phi(f_{t-k}(i), f_t(j)),$$

wherein $f_{t-k}(i)$ represents an i-th feature of the (t-k)-th feature map, $f_t(j)$ represents a j-th feature of the t-th feature map, $\phi(f_{t-k}(i), f_t(j))$ represents a distance between the two features, and $w_{i,j}$ represents its corresponding first loss weight.

12. The testing method of claim 11, wherein the first loss weight $W_{i,j}$ is expressed as follows:

$W_{i,j}$=(the number of pixels connected by optical flows of the two receptive fields of the input images corresponding to the i-th feature of the (t-k)-th feature map and the j-th feature of the t-th feature map)/(the number of pixels in the two receptive fields of the input images corresponding to the i-th feature of the (t-k)-th feature map and the j-th feature of the t-th feature map).

13. The testing method of claim 12, wherein, on condition that the optical flows have included o_forward and o_backward, (I) the o_forward representing an optical flow from the (t-k)-th feature map to the t-th feature map and the o_backward representing an optical flow from the t-th feature map to the (t-k)-th feature map are calculated, then (II) (i) a first number of pixels entering into a receptive field of the t-th input image corresponding to the j-th feature of the t-th feature map among pixels of the receptive field of the (t-k)-th input image corresponding to the i-th feature of the (t-k)-th feature map is calculated by using the o_forward and (ii) a second number of pixels entering into a receptive field of the (t-k)-th input image corresponding to the i-th feature of the (t-k)-th feature map among pixels of the receptive field of the t-th input image corresponding to the j-th feature of the t-th feature map is calculated by using the o_backward, and then (III) the first number of pixels and the second number of pixels are added to thereby obtain the number of pixels connected by the optical flows.

14. A learning device for learning parameters of convolutional neural network (CNN) by using multiple video frames, comprising:

a processor for (I) applying at least one convolutional operation to a (t-k)-th input image and applying at least one convolutional operation to a t-th input image, to thereby obtain a (t-k)-th feature map corresponding to a (t-k)-th frame and a t-th feature map corresponding to a t-th frame following the (t-k)-th frame, (II) calculating a first loss by referring to each of at least one distance value between each of pixels in the (t-k)-th feature map and each of pixels in the t-th feature map, and (III) backpropagating the first loss to thereby optimize at least one parameter of the CNN, wherein the first loss is calculated by multiplying (i) each of the at least one distance value between each of the features in the (t-k)-th feature map and each of the features in the t-th feature map and (ii) its corresponding first loss weight, and the first loss weight determines the contribution of the first loss term and is based on a degree of common region between a receptive field of the (t-k)-th feature map and that of the t-th feature map.

15. The learning device of claim 14, wherein, at the process of (II), the processor (i) calculates a (2-1)-th loss based on a difference between a (t-k)-th ground truth (GT) value and a (t-k)-th output value, which is generated by referring to the (t-k)-th feature map, and (ii) calculates a (2-2)-th loss based on a difference between a t-th GT value and a t-th output value, which is generated by referring to the t-th feature map, wherein, at the process of (III), the processor backpropagates the (2-1)-th loss and the (2-2)-th loss to thereby optimize the parameter of the CNN.

16. The learning device of claim 14, wherein the first loss (lc) is expressed as an equation below:

$$l_c = \sum_i \sum_j w_{i,j} \phi(f_{t-k}(i), f_t(j)),$$

wherein $f_{t-k}(i)$ represents an i-th feature of the (t-k)-th feature map, $f_t(j)$ represents a j-th feature of the t-th feature map, $\phi(f_{t-k}(i), f_t(j))$ represents a distance between the two features, and $w_{i,j}$ represents its corresponding first loss weight.

17. The learning device of claim 16, wherein the first loss weight $W_{i,j}$ is expressed as follows:

$W_{i,j}$=(the number of pixels connected by optical flows of the two receptive fields of the input images corresponding to the i-th feature of the (t-k)-th feature map and the j-th feature of the t-th feature map)/(the number of pixels in the two receptive fields of the input images corresponding to the i-th feature of the (t-k)-th feature map and the j-th feature of the t-th feature map).

18. The learning device of claim 17, wherein, on condition that the optical flows have included o_forward and o_backward, (1) the o_forward representing an optical flow from the (t-k)-th feature map to the t-th feature map and the o_backward representing an optical flow from the t-th feature map to the (t-k)-th feature map are calculated, then (2) (i) a first number of pixels entering into a receptive field of the t-th input image corresponding to the j-th feature of the t-th feature map among pixels of the receptive field of the (t-k)-th input image corresponding to the i-th feature of the (t-k)-th feature map is calculated by using the o_forward and (ii) a second number of pixels entering into a receptive field of the (t-k)-th input image corresponding to the i-th feature of the (t-k)-th feature map among pixels of the receptive field of the t-th input image corresponding to the j-th feature of the t-th feature map is calculated by using the o_backward, and then (3) the first number of pixels and the second number of pixels are added to thereby obtain the number of pixels connected by the optical flows.

19. The learning device of claim 15, wherein the processor includes (i) a first CNN for generating the (t-k)-th feature map and the (t-k)-output value by using the (t-k)-th input image and (ii) a second CNN for generating the t-th feature map and the t-th output value by using the t-th input image, wherein the second CNN is configured to have the same parameter as that of the first CNN, wherein, at the process of (II), the learning device calculates a second loss by adding the (2-1)-th loss calculated in the first CNN and the (2-2)-th loss calculated in the second CNN, and wherein, at the process of (III), the learning device optimizes the parameter of the first CNN by backpropagating the first loss and the second loss to the first CNN and then reflects the optimized parameter of the first CNN in the parameter of the second CNN.

20. The learning device of claim 15, wherein, at the process of (III), an integrated loss is calculated by using an equation below:

the integrated loss=$l_{d(t-k)} + l_{d(t)} + \lambda_c \times l_c$, wherein $l_{d(t-k)}$ represents the (2-1)-th loss, $l_{d(t)}$ represents the (2-2)-th loss, $l_c$ represents the first loss, and $\lambda_c$ is a constant, and wherein the parameter of the learning CNN is optimized by backpropagating the integrated loss.

21. The learning device of claim 15, wherein the (t-k)-th output value and the t-th output value are generated by applying at least one deconvolutional operation to the (t-k)-th feature map and the t-th feature map, respectively, wherein the (t-k)-th output and the t-th output are one of object detection and segmentation.

22. A testing device for testing convolutional neural network (CNN) for a test image as an input image, comprising:

a processor configured to process a test image after (i) a learning device has performed a process of applying at least one convolutional operation to a (t-k)-th training image corresponding to a (t-k)-th frame and applying at least one convolutional operation to a t-th training image corresponding to a t-th frame following the (t-k)-th frame, to thereby obtain a (t-k)-th feature map for training corresponding to the (t-k)-th frame and a t-th feature map for training corresponding to the t-th frame; (ii) the learning device has performed a process of calculating a first loss by referring to each of at least one distance value between each of pixels in the (t-k)-th feature map for training and each of pixels in the t-th feature map for training; and (iii) the learning device has performed a process of backpropagating the first loss to thereby optimize at least one parameter thereof; and apply at least one predetermined operation to the obtained test image by using the parameter of the learned learning CNN to thereby output a result value for testing, wherein the first loss is calculated by multiplying (i) each of the at least one distance value between each of the features in the (t-k)-th feature map and each of the features in the t-th feature map and (ii) its corresponding first loss weight, and the first loss weight determines the contribution of the first loss term and is based on a degree of common region between a receptive field of the (t-k)-th feature map and that of the t-th feature map.

23. The testing device of claim 22, wherein, at the process of (ii), the learning device has calculated a (2-1)-th loss based on a difference between a (t-k)-th ground truth (GT) value and a (t-k)-th output value for training, which is generated by referring to the (t-k)-th feature map for training, and calculates a (2-2)-th loss based on a difference between a t-th GT value and a t-th output value for training, which is generated by referring to the t-th feature map for training, wherein, at the process of (iii), the learning device has optimized the parameter of the learning CNN by backpropagating the (2-1)-th loss and the (2-2)-th loss.

24. The testing device of claim 22, wherein the first loss (lc) is expressed as an equation below:

$$l_c = \sum_i \sum_j w_{i,j} \phi(f_{t-k}(i), f_t(j)),$$

wherein $f_{t-k}(i)$ represents an i-th feature of the (t-k)-th feature map, $f_t(j)$ represents a j-th feature of the t-th feature map, $\phi(f_{t-k}(i), f_t(j))$ represents a distance between the two features, and $w_{i,j}$ represents its corresponding first loss weight.

25. The testing device of claim 24, wherein the first loss weight $W_{i,j}$ is expressed as follows:

$W_{i,j}$=(the number of pixels connected by optical flows of the two receptive fields of the input images corresponding to the *i*-th feature of the *(t-k)*-th feature map and the *j*-th feature of the *t*-th feature map)/(the number of pixels in the two receptive fields of the input images corresponding to the *i*-th feature of the *(t-k)*-th feature map and the *j*-th feature of the *t*-th feature map).

26. The testing device of claim 25, wherein, on condition that the optical flows have included o_forward and o_backward, (I) the o_forward representing an optical flow from the (t-k)-th feature map to the t-th feature map and the o_backward representing an optical flow from the t-th feature map to the (t-k)-th feature map are calculated, then (II) (i) a first number of pixels entering into a receptive field of the t-th input image corresponding to the j-th feature of the t-th feature map among pixels of the receptive field of the (t-k)-th input image corresponding to the i-th feature of the (t-k)-th feature map is calculated by using the o_forward and (ii) a second number of pixels entering into a receptive field of the (t-k)-th input image corresponding to the i-th feature of the (t-k)-th feature map among pixels of the receptive field of the t-th input image corresponding to the j-th feature of the t-th feature map is calculated by using the o_backward, and then (III) the first number of pixels and the second number of pixels are added to thereby obtain the number of pixels connected by the optical flows.

* * * * *